United States Patent [19]
Andersen et al.

[11] Patent Number: 5,405,594
[45] Date of Patent: *Apr. 11, 1995

[54] USE OF HYDROQUINONE TO PRECONDITION MANGANESE DIOXIDE FOR USE IN RECHARGEABLE ELECTROCHEMICAL CELLS

[75] Inventors: Terry N. Andersen, Edmond; Janet M. Berry; Joseph M. Derby, both of Oklahoma City, all of Okla.

[73] Assignee: Kerr-McGee Chemical Corporation, Oklahoma City, Okla.

[*] Notice: The portion of the term of this patent subsequent to May 17, 2011 has been disclaimed.

[21] Appl. No.: 108,143

[22] Filed: Aug. 16, 1993

Related U.S. Application Data

[63] Continuation of Ser. No. 907,286, Jul. 1, 1992, Pat. No. 5,312,457.

[51] Int. Cl.$^6$ .............................................. C01G 45/02
[52] U.S. Cl. .................................................. 423/605
[58] Field of Search .................... 429/224; 423/605; 29/623.1

[56] References Cited

U.S. PATENT DOCUMENTS

| | | | |
|---|---|---|---|
| 5,011,752 | 4/1991 | Kordesch et al. | 429/206 |
| 5,156,933 | 10/1992 | Yamaguchi et al. | 429/224 |
| 5,156,934 | 10/1992 | Kainthia et al. | 423/605 |

OTHER PUBLICATIONS

"Reduction and Dissolution of Manganese (III) and Manganese (IV) Oxides by Organics. 1. Reaction with Hydroquinone," A. T. Stone and J. J. Morgan, *Environ. Sci. Technol.*, vol. 18, No. 6 (Jan. 1984), pp. 450–456.

*Primary Examiner*—Wayne Langel
*Attorney, Agent, or Firm*—Herbert M. Hanegan

[57] ABSTRACT

A method of preconditioning manganese dioxide for use in a rechargeable alkaline electrochemical cell. The method includes the step of contacting unreduced manganese dioxide (e.g., electrolytic manganese dioxide) with a solution of hydroquinone in an environment having a pH greater than or equal to 5 that is essentially free of dissolved oxygen to partially reduce the unreduced manganese dioxide to manganese dioxide generally represented by the formula $$MnO_x$$

wherein x is between about 1.80 and about 1.92. Partially reducing the manganese dioxide to an oxidation state in this range before the cell is finally assembled and sealed lessens the degree by which the capacity of the cell is decreased as the cell is cycled and improves the overall performance of the cell. Also provided are preconditioned manganese dioxide suitable for use in a rechargeable alkaline electrochemical cell, a method of forming a rechargeable alkaline electrochemical cell containing a cathode having manganese dioxide as its active ingredient, and a rechargeable alkaline electrochemical cell.

16 Claims, 1 Drawing Sheet

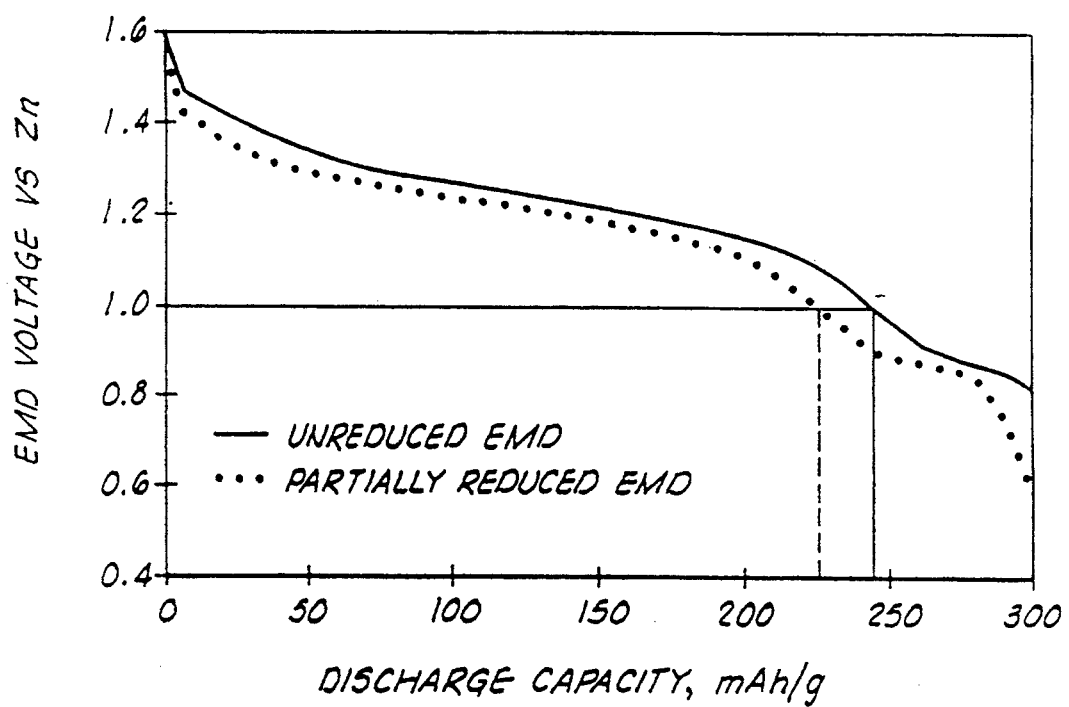

USE OF HYDROQUINONE TO PRECONDITION MANGANESE DIOXIDE FOR USE IN RECHARGEABLE ELECTROCHEMICAL CELLS

This application of a continuation of application Ser. No. 07/907,286 filed Jul. 1, 1992, now U.S. Pat. No. 5,312,457.

BACKGROUND OF THE INVENTION

1. Field of the Invention

This invention relates in general to methods of preparing battery grade manganese dioxide and to rechargeable electrochemical cells having manganese dioxide cathodes. The invention relates more particularly to methods of preconditioning manganese dioxide to make it more suitable for use in rechargeable alkaline electrochemical cells.

2. Description of the Prior Art

Rechargeable electrochemical cells having manganese dioxide cathodes have been developed for use in a variety of applications. Such cells can be manufactured into many sizes and designs including AA, C and D size cells and complex secondary batteries capable of supplying power to large electric motors. Although cells having manganese dioxide cathodes are currently typically manufactured with zinc anodes, they can be used in association with other anodes such as cadmium anodes as well.

Because a rechargeable alkaline cell having a manganese dioxide cathode is fully charged when it is assembled, its active life starts immediately after it is produced and its first cycle in use is a discharge cycle. The net oxidation state of the manganese dioxide and hence the storage capacity of the cell are at their maximum level when the cell is first assembled.

The mechanism by which manganese dioxide discharges in an alkaline solution is somewhat complex. Unreduced commercial battery grade manganese dioxide, e.g., electrolytic manganese dioxide ("EMD"), has the formula $(\gamma\text{-}\epsilon)\text{-MnO}_x$ wherein x is actually typically from about 1.94 to 1.97. The net oxidation state or valence of the manganese is less than 4 (about 3.88 to 3.94). As the cell discharges, the manganese dioxide is reduced to a manganese compound having the formula MnOOH with the net valence of the manganese being about 3. If certain precautions are taken, MnOOH may be oxidized at least part way back to manganese dioxide $((\gamma\text{-}\epsilon)\text{-MnO}_x)$ thus allowing the cell to be recharged. The discharge cycle of the cell must be limited or the MnOOH is further reduced to $Mn(OH)_2$, a compound having a net manganese valence of about 2. $Mn(OH)_2$ is not readily oxidized back to MnOOH or otherwise ultimately back to $(\gamma\text{-}\epsilon)\text{-MnO}_2$ and therefore diminishes the capacity of the cell to be recharged. In cells such as manganese dioxide-zinc alkaline cells, the discharge cycle is typically limited by limiting the amount of zinc or other active ingredient(s) forming the anode.

A drawback to rechargeable alkaline cells having commercial battery grade manganese dioxide cathodes is that once discharged, the manganese dioxide cannot be practically recycled or recharged to its original net oxidation state ($MnO_{1.94 \text{ to } 1.97}$) with a conventional taper charger or otherwise using a voltage low enough for the system to handle. Using too high of a voltage causes oxygen evolution and the formation of manganate ($MnO_4^{2-}$) ions, both being detrimental to the system. As a result, the capacity of the cell significantly decreases as the cell is used and is not subsequently regained. In cells in which the zinc or other active ingredient(s) of the anode is limited to prevent excessive discharge of the cell, the inability of the manganese dioxide to be fully recharged prevents the zinc or other anode material(s) from being returned to its original state.

In U.S. Pat. No. 5,011,752 to Kordesch et al., it is disclosed that the above problems can be significantly reduced or eliminated by preconditioning (essentially partially reducing) the manganese dioxide forming the cathode to a compound having the formula $MnO_x$ wherein x is generally between 1.70 and 1.90, i.e., to a compound having a net manganese valence of between 3.4 and 3.8. Upon discharge of the cell, the manganese dioxide material can be recharged to an oxidation state in this range using a voltage that the system can handle. The MnOOH produced upon partially reducing the manganese dioxide prior to use of the cell acts as reserve capacity in the cathode. Thus, the storage capacity of the cell is essentially returned to its original level every time the cell is recharged thereby reducing the loss in the capacity of the cell during the life thereof. The added capacity in the discharged form allows additional recharging capacity which is important in cells manufactured with a stoichiometric deficiency of zinc or other anode material.

U.S. Pat. No. 5,011,752 states that a number of methods of preconditioning the manganese dioxide have been contemplated, including: (a) cycling the cathode in an unsealed cell, replacing the zinc anode and sealing the cell; (b) adding a reducing agent to the cathode prior to the time when the cell is finally assembled and sealed; and (c) adding an over-charge reserve material to the cathode. Reducing agents disclosed to be suitable include zinc powder, oxalic acid, ethylene glycol, hydrazine, hydrogen gas, potassium borohydride, elemental sulfur and plastic powders.

Unfortunately, it is difficult to partially reduce manganese dioxide to the desired range by some of the above methods. Some reducing agents reduce the manganese dioxide to $Mn(OH)_2$ which, as described above, cannot be effectively recharged. The use of moderate to strong acidic reducing agents or acidic environments in association therewith can cause the formation of divalent manganese (manganous) ions which are also not rechargeable and do not provide reserve capacity. Many additive components displace active ingredients of the cell thereby diminishing the capacity of the cell.

There is a need for a method of partially reducing commercial battery grade manganese dioxide (e.g., EMD) to the desired extent in a uniform and practical manner.

SUMMARY OF THE INVENTION

In one aspect, the present invention provides a method of preconditioning manganese dioxide for use in a rechargeable alkaline electrochemical cell. The method comprises the step of contacting unreduced manganese dioxide with a solution of hydroquinone in a weakly acidic, neutral or alkaline environment (pH≧5) that is essentially free of dissolved oxygen. The solution of hydroquinone has a concentration of hydroquinone and is used in an amount, and the contacting step is carried out for a period of time and by means, sufficient to partially reduce the unreduced manganese dioxide to manganese dioxide generally represented by the formula $MnO_x$ wherein x is between 1.80 and 1.92.

In one embodiment of the method of preconditioning manganese dioxide, the unreduced manganese dioxide is electrolytic manganese dioxide. The solution of hydroquinone has a concentration of hydroquinone and is used in an amount such that the ratio of the total weight of hydroquinone contacted with the unreduced manganese dioxide while the method is carried out to the total weight of the initial unreduced manganese dioxide is from about 0.3:10 to about 2:10.

In another aspect, the present invention provides preconditioned manganese dioxide suitable for use in a rechargeable alkaline electrochemical cell having the formula $MnO_x$ wherein x is between 1.80 and 1.92. The manganese dioxide is preconditioned by the method of preconditioning manganese dioxide described above.

In another aspect, the present invention provides a method of forming a rechargeable alkaline electrochemical cell containing a cathode having manganese dioxide as its active ingredient. The method comprises preconditioning manganese dioxide by contacting unreduced manganese dioxide with a solution of hydroquinone in a weakly acidic, neutral or alkaline environment (pH≧5) that is essentially free of dissolved oxygen. The solution of hydroquinone has a concentration of hydroquinone and is used in an amount, and the contacting step is carried out for a period of time and by means, sufficient to reduce the unreduced manganese dioxide to manganese dioxide generally represented by the formula $MnO_x$ wherein x is between 1.80 and 1.92. A cathode is formed using the preconditioned manganese dioxide and the cathode is combined with an anode and an electrolyte to form the cell.

In one embodiment of the method of forming a rechargeable cell, the unreduced manganese dioxide is electrolytic manganese dioxide. The solution of hydroquinone has a concentration of hydroquinone and is used in an amount such that the ratio of the total weight of hydroquinone contacted with the unreduced manganese dioxide while the preconditioning step is carried out to the total weight of the initial unreduced manganese dioxide is from about 0.3:10 to about 2:10.

In yet another aspect, the present invention provides a rechargeable alkaline electrochemical cell formed in accordance with the method of forming such a cell described above. In one embodiment, the anode comprises as its active material an element selected from the group of zinc, hydrogen, iron and cadmium. In a particularly preferred embodiment, the anode comprises zinc as its active material.

Applicants have discovered that chemical reaction of manganese dioxide such as electrolytic manganese dioxide with hydroquinone under specific reaction conditions uniformly partially reduces the manganese dioxide to the critical rechargeable product, MnOOH, in accordance with Equation (1) below:

$$MnO_2 + H_2O + e^- \rightarrow MnOOH + OH^- \qquad (1)$$

Under oxidizing conditions, hydroquinone is quickly converted to quinone in accordance with Equation (2) below:

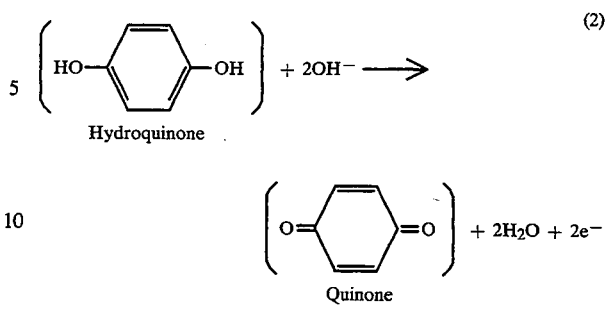

When used in accordance with the inventive method, hydroquinone does not significantly further reduce the manganese dioxide to undesirable $Mn(OH)_2$ or cause the formation of $MnO_4^{2-}$ ions.

Reduction of manganese dioxide to a net oxidation state in the desired range using hydroquinone in accordance with the inventive method is practical and potentially economical. Hydroquinone reduces the manganese dioxide rapidly. It is a commercially available product that is water soluble.

Cells having cathodes formed with manganese dioxide preconditioned to have the formula $MnO_x$ wherein x is between 1.80 and 1.92 do not lose capacity during the discharge/charge cycles as rapidly as cells formed with unreduced manganese dioxide cathodes ($MnO_{1.96}$). The preconditioned manganese dioxide can be readily recharged back more nearly to its original oxidation state using a voltage that the system can handle. The reserve capacity created by the MnOOH produced by the partial reduction provides additional recharging capacity to the cell.

It is, therefore, a principal object of the present invention to provide an improved method of forming battery grade manganese dioxide, specifically an improved method of preconditioning manganese dioxide for use as a cathode in a rechargeable alkaline electrochemical cell.

Additional objects of the invention are to provide improved preconditioned manganese dioxide for use as a cathode in a rechargeable alkaline electrochemical cell, and to provide an alkaline electrochemical cell containing a manganese dioxide cathode and having improved overall cumulative capacity and more uniform storage capacity per cycle over the cycle life of the cell.

Numerous other objects, features, and advantages of the present invention will be readily apparent to those skilled in the art upon a reading of the following disclosure including the examples provided therewith.

BRIEF DESCRIPTION OF THE DRAWING

The FIGURE is a graph corresponding to Example I and illustrating the extent to which electrolytic manganese dioxide is reduced in accordance with the present invention.

DESCRIPTION OF PREFERRED EMBODIMENTS

In a first aspect, the present invention provides a method of preconditioning manganese dioxide for use in a rechargeable alkaline electrochemical cell. The method comprises the steps of:

(a) forming a solution of hydroquinone that is essentially free of dissolved oxygen;

(b) forming a slurry including unreduced manganese dioxide suspended in a weakly acidic, neutral or alkaline solution (i.e., a solution having a pH greater than or equal to 5), the slurry being essentially free of dissolved oxygen;

(c) adding the solution of hydroquinone to the slurry without allowing a significant amount of oxygen to enter the slurry; and (d) after allowing the hydroquinone to partially reduce the unreduced manganese dioxide to manganese dioxide generally represented by the formula $MnO_x$ wherein x is between 1.80 and 1.92, separating the partially reduced manganese dioxide from the slurry.

As used herein and in the appended claims, unreduced manganese dioxide or unreduced electrolytic manganese dioxide means manganese dioxide or electrolytic manganese dioxide not yet preconditioned in accordance with the inventive method. Also, as used herein and in the appended claims, the "cathode" (e.g., the manganese dioxide cathode) and the "anode" (e.g., the zinc anode) of a cell mean the cathode and anode of the cell during discharge of the cell. As known to those skilled in the art, the cathode of a rechargeable cell is the electrode of the cell where reduction occurs, and the anode of a rechargeable cell is the electrode of the cell where oxidation occurs. On discharge, the manganese dioxide electrode is the cathode and the zinc electrode is the anode. On recharge, the opposite is the case.

The unreduced manganese dioxide used in the invention is preferably electrolytic manganese dioxide. As used herein and in the appended claims, "electrolytic manganese dioxide" ("EMD") means manganese dioxide formed by electrolysis and represented by the general formula $\gamma\text{-}MnO_x$ wherein x is from 1.94 to 1.97. EMD is generally formed by roasting natural manganese dioxide ore (having gangue separated) and leaching the roasted ore with sulfuric acid to form a solution of manganous sulfate. The manganous sulfate solution is then subjected to electrolysis and EMD is formed. Chemical manganese dioxide ("CMD"), on the other hand, is typically formed by precipitating manganese dioxide from the manganous sulfate solution and chemically oxidizing the precipitate. CMD is generally represented by the formula $MnO_x$ wherein x is typically from 1.93 to 1.95. Although it is not preferred at this time, CMD can also be employed as the unreduced manganese dioxide used in the invention. An example of EMD suitable for use in the present invention is EMD that is marketed by Kerr-McGee Corporation under the trade name "KM Manganese Dioxide".

As known to those skilled in the art, the value corresponding to x of the formula $MnO_x$ as used herein and in the appended claims is determined from chemical assays consisting of (a) the "$MnO_2$" content, determined from the amount of a reducing agent (e.g., ferrous sulfate) needed to dissolve the sample, and (b) the total manganese content, determined in a number of ways. Such assays are detailed in a handbook edited by D. Glover, B. Schumm, Jr. and A. Kozawa entitled *Handbook of Manganese Dioxides, Battery Grade*, pp. 21–46 (1989), which is incorporated by reference herein. The value of x is given in terms of the above two assays as $$x = 1 + \frac{54.94 \, (\% \, MnO_2)}{86.94 \, (\% \, Mn)}$$

Although other means of contacting the unreduced manganese dioxide with the hydroquinone can certainly be employed, adding a solution of the hydroquinone to a weakly acidic, neutral or alkaline (pH $\geq$ 5) slurry of the unreduced manganese dioxide is preferred for several reasons. First, adding a solution of the hydroquinone to a slurry of the unreduced manganese dioxide results in reduction of the manganese dioxide on a relatively uniform basis. Adding dry manganese dioxide directly to a solution of the hydroquinone could potentially result in excessive reduction of the manganese dioxide first added to the solution and insufficient reduction of the manganese dioxide added thereafter. Use of a slurry of the manganese dioxide allows the hydroquinone to be uniformly admixed with the manganese dioxide. Also, dissolved oxygen can be easily removed from the slurry and the solution of deaerated hydroquinone can be easily added to the slurry without oxygen entering the slurry. Oxygen rapidly oxidizes hydroquinone to quinone which will not partially reduce manganese dioxide when contacted therewith.

The means by which the solution of hydroquinone is formed is not critical as long as oxygen (e.g., dissolved molecular oxygen and air) is kept out of the solution. As used herein and in the appended claims, the phrase "essentially free of dissolved oxygen" means that the solution or slurry either does not contain any dissolved oxygen or does not contain enough dissolved oxygen to oxidize a significant portion (e.g., 10% by weight) of the hydroquinone used in the method. Similarly, the phrase "without allowing a significant amount of oxygen to enter the slurry" means either without allowing any oxygen to enter the slurry or without allowing enough oxygen to enter the slurry to oxidize a significant amount (e.g., 10% by weight) of the hydroquinone used in the method.

A solution of hydroquinone that is essentially free of dissolved oxygen can be prepared by placing a known (weighed) amount of hydroquinone (typically in crystal form) in a suitable container such as a flask or drum, deaerating the container by displacing the air in the container with an inert gas such as nitrogen or some other means, deaerating an appropriate amount of water by purging the water with an inert gas such as nitrogen or some other means and adding the water to the container without allowing oxygen to enter the container. For example, the deaerated water can be added to the deaerated container without allowing a significant amount of oxygen to enter the container by pumping the deaerated water into the container (closed) and allowing the displaced inert gas in the container to exit through a one-way valve or through a water trap. Alternatively, the solution of hydroquinone can be prepared in an oxygen-free environment, such as a nitrogen glove box or glove bag. In such an environment, the hydroquinone can be added directly to a deaerated beaker of water and stirred until it dissolves therein.

The slurry of manganese dioxide can also be formed by a variety of means as long as the slurry is essentially free of dissolved oxygen at the time the solution of hydroquinone is added thereto. Because a highly acidic environment can cause the formation of manganous ($Mn^{2+}$) ions, it is important for the slurry to be weakly acidic, neutral or alkaline in nature, i.e., to have a pH greater than or equal to 5. The pH of the slurry is preferably from about 5 to about 10, more preferably from about 6 to about 8. A pH greater than about 10 is not necessary and merely results in handling and disposal problems.

The slurry is preferably formed by adding the manganese dioxide (EMD is typically sold in powder form) to a 0.01 molar solution of sodium hydroxide or other solution having the desired pH. It is important for the slurry to have a solids content, i.e., a concentration of manganese dioxide, low enough to permit easy mixing so as to allow the hydroquinone to be uniformly dispersed throughout the manganese dioxide so that uniform partial reduction of the manganese dioxide can be achieved. The solids content of the slurry is preferably around 40%. The slurry is then preferably purged with nitrogen or some other inert gas to remove oxygen therefrom.

The solution of hydroquinone can be added to the manganese dioxide slurry in any way that does not allow a significant amount of oxygen to enter the slurry. For example, the solution of hydroquinone can be added to the slurry by gravity or pumping with simultaneous displacement of an equal volume of inert gas through a trap or a valve. The slurry is preferably stirred or agitated while the hydroquinone solution is added thereto in order to uniformly disperse the hydroquinone throughout the slurry. The slurry is preferably maintained at ambient temperature (about 23° C.±3° C.) or at a slightly warmer temperature (up to 35° C.) while the hydroquinone solution is added thereto and while the reaction is carried out.

As described above, it is an important goal of this invention to reduce the net oxidation state of the manganese dioxide to the desired range by partially reducing the manganese dioxide ($MnO_2$) to the compound MnOOH. If the $MnO_2$ is significantly further reduced to $Mn(OH)_2$ and/or other manganese compounds that cannot be recharged, the capacity of the cell in which the manganese material is used can be seriously diminished or even destroyed., The concentration of the hydroquinone solution, the amount of the hydroquinone solution that is used and the rate at which the hydroquinone solution is added to the slurry are all very important in achieving this goal.

The hydroquinone solution preferably has a concentration of hydroquinone and is preferably added to the slurry in an amount such that the ratio of the total weight of hydroquinone contacted with the unreduced manganese dioxide as the method is carried out to the total weight of the initial unreduced manganese dioxide is from about 0.3:10 to about 2:10. A weight ratio of hydroquinone to unreduced manganese dioxide in this range partially reduces the manganese dioxide to the desired oxidation state. The concentration of hydroquinone in the solution and the amount of the hydroquinone solution added to the slurry are most preferably such that the ratio of the total weight of hydroquinone contacted with the unreduced manganese dioxide to the total weight of the unreduced manganese dioxide is about 0.5:10. A weight ratio of hydroquinone to unreduced manganese dioxide of about 0.5:10 corresponds very closely to a 9% reduction of the manganese dioxide through a one-electron change, i.e., uniformly from $MnO_2$ to MnOOH.

In order to prevent excessive reduction of some portions of the manganese dioxide to $Mn(OH)_2$ and/or other undesirable compounds and insufficient reduction of other portions of the manganese dioxide, it is important to use a dilute solution of the hydroquinone and to slowly add the solution to the slurry. The maximum concentration of hydroquinone in the solution that can be achieved is limited by the solubility of the hydroquinone in the solution. Generally, about 7% by weight based on the weight of the solution of hydroquinone is soluble in water at 23° C. Approximately 10% by weight of the hydroquinone is soluble at increased temperature. Preferably, the hydroquinone is present in the solution thereof in a concentration of from about 1% by weight based on the weight of the solution to a concentration corresponding to the maximum amount of hydroquinone that is soluble in the solution. More preferably, the hydroquinone is present in the solution thereof in a concentration of from about 1% to about 10% by weight, most preferably from about 5% to about 10% by weight, based on the total weight of the solution. Use of a solution having a concentration of hydroquinone in the range of from about 5% to about 10% by weight based on the total weight of the solution minimizes the amount of excess water subsequently required to be filtered.

The solution of hydroquinone is preferably added to the slurry at a rate slow enough and the slurry is stirred at a rate rapidly enough to allow the hydroquinone to be uniformly admixed throughout the slurry and prevent over-reduction (i.e., to $Mn(OH)_2$) of the first portion of manganese dioxide contacted with hydroquinone from occurring. A slow rate of addition allows time for protons in the $MnO_2$/MnOOH reaction interface to move into the $MnO_2$ particles thus keeping the surface of the manganese dioxide partially oxidized and preventing over-reduction of the manganese dioxide. Although the particular rate of addition employed will vary depending upon the amounts of the components involved, method of addition used and so forth, the solution of hydroquinone is preferably added to the slurry continuously over a period of time of from about 5 to about 60 minutes, more preferably from about 10 to about 20 minutes.

After the solution of hydroquinone is added to the slurry, the slurry is preferably continuously stirred or agitated for a time sufficient to allow the desired partial reduction to occur. Although partial reduction of the manganese dioxide to manganese dioxide generally represented by the formula $MnO_x$ wherein x is between 1.80 and 1.92 achieves the objects of this invention, the manganese dioxide is preferably partially reduced to manganese dioxide generally represented by the formula $MnO_x$ wherein x is from about 1.88 to about 1.92. An oxidation state in this preferred range is low enough to overcome the problems with using unreduced manganese dioxide as the active cathode ingredient in a rechargeable alkaline electrochemical cell yet still high enough to allow the cell to achieve optimum results. In most systems, 30 minutes or more are generally required for sufficient reduction of the manganese dioxide to occur. Preferably, from about 30 to about 90 minutes, more preferably from about 50 to about 70 minutes, are allowed to elapse after all of the hydroquinone solution is added to the slurry and before the partially reduced manganese dioxide is separated therefrom. The ability of the partially reduced manganese dioxide to be recharged is diminished if the partially reduced manganese dioxide is allowed to remain in the slurry for a prolonged time (e.g., overnight), most likely as a result of excessive reduction of some of the manganese dioxide to $Mn(OH)_2$.

The partially reduced manganese dioxide can be separated from the slurry by filtration or other suitable means. After approximately an hour of reaction time, air may access the system without adverse effects. Once separated, the partially reduced manganese dioxide is then preferably washed with water to remove reduction by-products and dried overnight under a vacuum at 80° C. If excess hydroquinone and/or reduction by-products are not removed from the partially reduced manganese dioxide, further reduction of the manganese dioxide to undesirable manganese compounds can occur. The quinone formed in the method can be recovered and hydroquinone can be recycled therefrom if desired.

In a second aspect, the present invention provides manganese dioxide preconditioned in accordance with the above method. The preconditioned manganese dioxide is preferably stored in a dry, closed container sufficient to prevent entry of air and moisture at ambient temperature.

In a third aspect, the present invention provides a method of forming a rechargeable alkaline electrochemical cell containing a cathode having manganese dioxide as its active ingredient. The method comprises preconditioning manganese dioxide in accordance with the method forming the first aspect of the invention described above, forming a cathode using the preconditioned manganese dioxide, and combining the cathode with an anode and an electrolyte to form the cell.

The method of the third aspect of the present invention is particularly suitable for use in forming alkaline cells that employ zinc anodes (referred to herein as "rechargeable alkaline zinc-manganese dioxide cells"). Examples of rechargeable alkaline zinc-manganese dioxide cells that can be formed using preconditioned manganese dioxide in accordance with the inventive method are described in U.S. Pat. Nos. 5,011,752, 5,043,234, 4,957,827, 4,925,747 and 4,929,520 and in PCT application No. PCT/CA90/00379 (published Aug. 22, 1991), the full disclosures of which are incorporated by reference herein.

In forming the cathode, a conductive matrix material such as graphite or a mixture of graphite and one or more other carbonaceous compounds and/or graphite fiber is preferably admixed with the preconditioned manganese dioxide, carbon black and a small amount of the electrolyte (e.g., potassium hydroxide). The admixture can be formed into a paste, positioned in the cell and pressed into a pellet or other type of mass therein. In a cylindrical cell, the mixture is typically ground and compacted into a cylindrical ring shape for assembly into the cell. A second type of cylindrical cell is referred to as a jellyroll cell. In a jellyroll cell, the cathode and anode, having a separator therebetween, are rolled as thin, flat sheets on a current collector. The sheets are then rolled up and placed in a cylindrical can.

The zinc anode preferably comprises a zinc powder mixed with a gelling agent. A corrosion inhibitor such as mercury can be included in the anode formulation to reduce hydrogen gassing within the cell. The ratio of the cathode capacity to the anode capacity in a rechargeable cell having an EMD cathode and a zinc anode is generally in the range of from 2:1 to 4:3. An example of a suitable electrolyte is a 6N to 12N (typically 8-9N) solution of potassium hydroxide. An example of a suitable anolyte, which is essentially electrolyte that is used in forming the anode, is a 6N to 12N solution of potassium hydroxide having zinc oxide dissolved therein. The zinc oxide functions to reduce corrosion of the zinc metal forming the anode and provides an overcharge reserve at the anode. An example of a separator that can be employed between the cathode and the anode is a cellulose, non-woven material containing fiber reinforcement.

Other rechargeable electrochemical cell systems in which manganese dioxide preconditioned in accordance with the invention can be employed include alkaline cells having anodes that include hydrogen, iron, cadmium, mercury, lead and bismuth.

In a fourth aspect, the present invention provides a rechargeable alkaline electrochemical cell formed in accordance with the above method.

In order to illustrate a clear understanding of the present invention, the following Examples are given. Although the Examples are presented to illustrate certain specific embodiments of the invention, they are not to be construed as to be restrictive of the scope and spirit thereof.

EXAMPLE I

Electrolytic manganese dioxide ("EMD") was preconditioned using hydroquinone as a reducing agent in accordance with the method of the present invention. The extent to which the preconditioned EMD was reduced was determined by comparing the practical discharge capacity of the preconditioned EMD to the practical discharge capacity of unreduced EMD.

Preconditioning the EMD

First, approximately 10 g of EMD were preconditioned in accordance with the present invention. The EMD used was "KM Manganese Dioxide" obtained from Kerr-McGee Chemical Co. (Lot 0718). This EMD is standard alkaline-battery grade EMD made by electrolysis of a manganous sulfate solution.

An aqueous solution essentially free of dissolved oxygen and containing approximately 1.0% by weight of hydroquinone was prepared by weighing 0.50 g of hydroquinone and admixing it with 50 mL of deaerated water in a beaker, transferring the solution to an addition funnel and sealing the funnel with a stopper, all in a nitrogen glove bag. An EMD slurry essentially free of dissolved oxygen and having a pH of about 10.7 was then formed by combining the EMD with approximately 150 mL of a 0.01M sodium hydroxide solution in a multi-neck round bottom flask. The solids content of the slurry was about 6.2%. The addition funnel was connected to one neck of the flask and dissolved oxygen was removed from the slurry by purging the slurry with nitrogen.

The entire solution of hydroquinone was then added to the slurry on a continuous basis at a rate of about 5 mL per minute over a 10 minute period without allowing a significant amount of oxygen to enter the slurry by controlled gravity drip from the sealed addition funnel. The slurry was maintained at ambient temperature and continuously stirred with a magnetic stirring bar and bubbling nitrogen under a nitrogen atmosphere while the solution of hydroquinone was added thereto and while the reaction was carried out. The ratio of the total weight of hydroquinone added to the slurry to the total weight of the initial unreduced EMD was about 0.5:10.

After allowing the components to react for about 1 hour after the entire solution of hydroquinone was added to the slurry, the slurry was filtered through a 0.45 micron MILLIPORE ® filter to remove the partially reduced EMD therefrom. The partially reduced EMD was then washed with distilled water and filtered, three times, and dried for fifteen hours in a vacuum oven at 80° C.

Determining the Extent of the Reduction

Next, approximately 5 g of the partially reduced ("preconditioned") EMD were admixed with 14.8 g of Type "KS44" graphite supplied by Lonza and approximately 2.95 g of a 9M potassium hydroxide solution. Of this admixture, 4.54 g (which contained 1.0 g EMD) were pressed into a pellet in a plastic cell to form a test electrode in the cell. The cell was completed with a zinc counterelectrode (also used as a reference electrode) and an electrolyte consisting of a 9M potassium hydroxide solution. The EMD test electrode was then cathodically polarized using a polarization current of approximately 20 mA per gram of EMD in the pellet by means of a constant current power supply. The practical (first-electron) capacity of the EMD was then determined as the current passed per unit weight of the EMD multiplied by the time required for the potential of the EMD to fall to 1.0 V vs the zinc counter electrode. Details of the laboratory set up and test procedure used are provided by an article by S. F. Burkhardt in the handbook edited by D. Glover, B. Schumm, Jr. and A. Kozawa entitled "Handbook of Manganese Dioxides, Battery Grade" (1989).

The same test was then carried out on approximately 5 g of EMD from the same batch of EMD from which the EMD preconditioned as described above was obtained. This EMD ("the parent EMD"), however, was not preconditioned in accordance with the present invention.

Discharge curves for the preconditioned EMD and the parent EMD formed by plotting the EMD vs the zinc reference electrode potential (V) against the discharge capacity or "depth of discharge" of the EMD (milliamp hours per gram of EMD) for each are shown by the Figure of this application. The extent to which the preconditioned EMD was partially reduced is represented by the difference in the discharge capacities of the two samples at an EMD potential of 1.0 V (hereinafter "the practical discharge capacities"). The practical discharge capacity of the parent EMD was approximately 246 while the practical discharge capacity of the preconditioned EMD was approximately 229. The difference between these two capacities, 17 milliamp hours per gram of EMD, divided by the discharge capacity of the parent EMD, 246 milliamp hours per gram of EMD, yields a fractional reduction of 0.07 or 7%. This corresponds to EMD having the general formula $MnO_x$ wherein x is about 1.915 (as determined from $MnO_2$ and Mn assays as described above).

Thus, use of hydroquinone in accordance with the invention effectively reduces EMD to a compound having a net oxidation state in the desired range.

EXAMPLE II

The rechargeability of electrolytic manganese dioxide ("EMD") preconditioned in accordance with the present invention was determined by electrochemically cycling an electrode pressed from the EMD in an electrochemical cell. The rechargeabilities of other EMD samples were then determined in the same way, and the results of the tests were compared.

Forming the Test Samples

Each test sample was formed using a batch of "KM Manganese Dioxide" EMD obtained from Kerr-McGee Chemical Co. (Lot 0718).

The EMD forming the first sample, test sample A, was preconditioned in accordance with the invention as described in Example I.

The EMD forming the second test sample, test sample B, was preconditioned in accordance with the invention as described in Example I except the hydroquinone and EMD were left in contact and allowed to react for about 17 hours as opposed to about 1 hour before the slurry was filtered to remove the partially reduced EMD therefrom.

The EMD forming the third test sample, test sample C, was not preconditioned in any way.

Determining the ReChargeabilities of the Test Samples

The rechargeabilities of the test samples were then determined.

In each test, approximately 1.0 g of the corresponding sample was admixed with approximately 3.3 g of Type "KS-44" graphite supplied by Lonza and approximately 0.67 g of a 9M potassium hydroxide solution. The admixture was pressed into a pellet in a plastic cell to form a test electrode in the cell. The cell was then completed with a zinc counter-electrode and an electrolyte consisting of a 9M potassium hydroxide solution.

The rechargeability of the sample was then evaluated by (1) discharging the cell through a 24-ohm resistor and determining the time required to reach a cell voltage of 1.20 V, (2) recharging the cell, and (3) again discharging the cell as in step (1). Approximately 1 to 2 hours were required for the first discharge. The cell was recharged with a constant current and constant voltage power supply at a constant current of 20 mA until the cell voltage rose to 1.73 V (as measured with a voltmeter). The recharge mode was then shifted to constant voltage. The total recharge time was approximately 22 to 23 hours making the total discharge/recharge cycle time about 24 hours. After the recharge, the cell was discharged through a 24 ohm load again as described above. In each discharge cycle, the time (seconds) that elapsed as the cell discharged (the discharge time) was recorded at various cell voltages from the initial voltage to the voltage end point (cut-off) (1.20 V).

The results of the tests are shown by Table I below.

TABLE I

| | Rechargeabilities of EMD Samples | | | | | |
|---|---|---|---|---|---|---|
| | Test Sample A[1] | | Test Sample B[2] | | Test Sample C[3] | |
| | Discharge Cycle 1 (Sec.)[4] | Discharge Cycle 2 (Sec.)[4] | Discharge Cycle 1 (Sec.)[4] | Discharge Cycle 2 (Sec.)[4] | Discharge Cycle 1 (Sec.)[4] | Discharge Cycle 2 (Sec.)[4] |
| V[5] | | | | | | |
| 1.5 | 50 | 300 | N/A | 23 | 20 | 110 |
| 1.4 | 175 | 940 | 70 | 170 | 400 | 692 |
| 1.3 | 1880 | 2270 | 780 | 960 | 2510 | 2160 |
| 1.25 | 3270 | 3370 | 1700 | 1720 | 4300 | 3370 |
| 1.2 | 6100 | 5200 | 4100 | 3400 | 7400 | 5700 |

[1] EMD preconditioned in accordance with the present invention.
[2] EMD preconditioned in accordance with the present invention except the EMD was contacted with the hydroquinone for about 17 hours.
[3] EMD not preconditioned (unreduced EMD).
[4] Time elapsed during discharge (discharge time).
[5] Discharge potential, V, vs the zinc reference electrode.

The rechargeabilities of the test samples are indicated to a large extent by the discharge times at the cut-off voltages. As shown by Table I, the discharge time for test sample A (EMD preconditioned in accordance with the invention) at the cut-off voltage in the first discharge cycle was approximately 6100 seconds whereas the discharge time for test sample C (unreduced EMD) at the cut-off voltage in the first discharge cycle was approximately 7400 seconds. This demonstrates that partial discharge of test sample A had occurred before the rechargeability test was initiated. The discharge time for test sample B (EMD contacted with hydroquinone for about 17 hours) at the cut-off voltage in the first discharge cycle was approximately 4100 seconds which indicates that more intensive reduction occurred in test sample B.

After recharging, the discharge times of test sample A at various cell voltages were approximately equal to the discharge times of test sample C at corresponding cell voltages indicating that the EMD preconditioned in accordance with the invention acquired extra charge or "reserve capacity" in discharge form during the recharge cycle. Of course, this reserve capacity is the desire of the invention. The discharge times of test sample A at various cell voltages during the second discharge cycle were definitely higher than the corresponding discharge times for test sample B during the second discharge cycle indicating that contacting the EMD with hydroquinone for about 17 hours did not provide as much reserve capacity as contacting the EMD with hydroquinone for about 1 hour.

It is important to note that the charge drawn through the EMD on discharge should not exceed approximately 0.5 electron per manganese (Mn) atom in the EMD, or the EMD will undergo intensive swelling and break up which will greatly limit the capacity per cycle and the cycle life of the EMD.

EXAMPLE III

Next, discharge capacity tests were conducted on actual AA size rechargeable alkaline zinc-manganese dioxide cells in which the manganese dioxide forming the cathode of the cells was either electrolytic manganese dioxide ("EMD") preconditioned in accordance with the present invention or unreduced EMD.

Preconditioning the EMD

First, "KM Manganese Dioxide" EMD obtained from Kerr-McGee Chemical Co. (Lot 1124) was preconditioned in accordance with the present invention. An aqueous solution essentially free of dissolved oxygen and containing approximately 9.1% by weight of hydroquinone was formed by dissolving 98.3 g of hydroquinone in 983 mL of distilled water in a nitrogen glove box. An EMD slurry essentially free of dissolved oxygen and having a pH of about 5.6 was then formed by combining approximately 1967 g of the EMD with approximately 2950 mL of a 0.01M sodium hydroxide solution in a 12 liter round bottom flask. The solids content of the slurry was about 40% by weight. Dissolved oxygen was removed from the slurry by purging the slurry with nitrogen. The entire solution of hydroquinone was then added to the slurry on a continuous basis at a rate of about 20 mL per minute over a 50 minute period without allowing a significant amount of oxygen to enter the slurry. The slurry was maintained at ambient temperature and continuously stirred with a magnetic stirrer and bubbling nitrogen in a nitrogen atmosphere while the solution of hydroquinone was added thereto and while the reaction was carried out. The ratio of the total weight of hydroquinone added to the slurry to the total weight of the initial unreduced EMD was about 0.5:10. After allowing the components to react for about one hour after the entire solution of hydroquinone was added to the slurry, the slurry was filtered through a 0.45 micron MILLIPORE ® filter to remove the partially reduced EMD therefrom. The partially reduced EMD was then washed with distilled water and filtered, three times, and dried for approximately 15 hours in a vacuum oven at 80° C. This preconditioned EMD is hereinafter referred to as "EMD Sample A".

Next, EMD from the same batch of EMD (Lot 1124) was preconditioned as described above in association with EMD Sample A except the ratio of the total weight of the hydroquinone to the initial unreduced EMD was about 1 to 10. In forming this sample, hereinafter referred to as "EMD Sample B", 10 g of hydroquinone was dissolved in 100 mL of water to form the aqueous hydroquinone solution. The EMD slurry contained 100 g of the EMD and 150 mL of a 0.01M sodium hydroxide solution.

EMD Samples A and B were then tested in accordance with the procedure described in Example I to determine the extent that the corresponding manganese dioxide had been reduced. These tests showed that EMD Sample A had been reduced by about 9.1% and EMD Sample B had been reduced by about 14.1%. Using $MnO_2$ and Mn assays as described above, it was determined that the EMD forming EMD Sample A had the general formula $MnO_x$ wherein x is about 1.919 and that the EMD forming EMD Sample B had the general formula $MnO_x$ wherein x is about 1.887.

Forming the Cells

Next, several cells were then formed using EMD Samples A and B. Several cells were also formed using unreduced EMD obtained from the same batch of EMD (Lot 1124) from which the EMD forming EMD Samples A and B was obtained (hereinafter "EMD Sample C"). Finally, several cells were formed using unreduced EMD obtained from two other batches of "KM Manganese Dioxide" EMD, one batch from Lot 1887, EMD quite similar to the EMD from Lot 1124, (hereinafter "EMD Sample D") and one from Lot 2919, EMD that was more porous than the EMD from Lot 1124, (hereinafter "EMD Sample E").

In forming the cells, the EMD samples were first divided into roughly 9 g samples. The samples were then formed into cathodes and combined with zinc anodes and an electrolyte (8-9N potassium hydroxide) to form AA-size rechargeable alkaline zinc-manganese dioxide cells. Details regarding formation of the cells are provided by U.S. Pat. No. 5,011,752 and PCT application No. PCT/CA90/00379 (published Aug. 20, 1991).

The Discharge capacity Tests

Each AA cell was deep-discharged through a 3.9 ohm load to a constant 0.9 V cut-off. The 0.9 V cut-off corresponded to depletion of zinc in the anode (the negative electrode). The cell was then recharged with a constant current and constant voltage power supply at a constant current of 20 mA until the cell voltage rose to 1.73 V (as measured with a voltmeter). The recharge mode was then shifted to constant voltage. Finally, the cell was rested on open circuit for 1 hour. The total time for discharge, recharge and rest was 24 hours. This discharge/recharge/rest cycle was repeated up to 30 times and the discharge capacity (amp hours) of each cycle was recorded as an indicator of the performance of the cell.

The discharge capacities of five of the cells in several discharge cycles, one cell for each EMD sample, are shown by Table II below.

TABLE III

Discharge Capacities of AA Rechargeable Alkaline Zinc-Manganese Dioxide Cells

Discharge Capacity (Amp. Hr.)[1]

| Cycle No. | EMD Sample A[2] | EMD Sample B[3] | EMD Sample C[4] | EMD Sample D[5] | EMD Sample E[6] |
|---|---|---|---|---|---|
| 1 | 1.178 | 1.070 | 0.910 | 0.880 | 1.084 |
| 2 | 0.991 | 0.747 | 0.813 | 0.902 | 0.987 |
| 3 | 0.885 | 0.539 | 0.726 | 0.879 | 0.945 |
| 4 | 0.795 | 0.597 | 0.753 | 0.826 | 0.876 |
| 5 | 0.748 | 0.590 | 0.677 | 0.778 | 0.817 |
| 10 | 0.552 | 0.526 | 0.425 | 0.532 | 0.549 |
| 12 | 0.469 | 0.482 | 0.364 | 0.453 | 0.461 |
| 15 | 0.433 | 0.440 | 0.317 | 0.387 | 0.383 |
| 17 | 0.417 | 0.418 | 0.299 | 0.357 | 0.347 |
| 20 | 0.384 | | | 0.312 | 0.305 |
| 25 | 0.330 | | | 0.269 | 0.258 |
| 30 | 0.311 | | | 0.255 | 0.238 |
| Mean Capacity for 30 cycles: | 0.515 | | | 0.466 | 0.488 |

[1]The discharge capacity (the discharge capacity summed over the time of discharge until cutoff) (amp hour) of the cell achieved by discharge of the cell through a 3.9 ohm load to a 0.9 V cut-off in each cycle.
[2]The cell contained a cathode having EMD reduced by about 9.1% in accordance with the present invention as its active ingredient.
[3]The cell contained a cathode having EMD reduced by about 14.1% in accordance with the present invention as its active ingredient. The tests of this cell were stopped after 17 cycles.
[4]The cell contained a cathode having unreduced EMD (not preconditioned in accordance with the invention) obtained from the same batch of EMD from which the EMD preconditioned in accordance with the present invention (EMD Samples A and B) was obtained. The tests of this cell were stopped after 17 cycles.
[5]The cell contained a cathode having unreduced EMD (not preconditioned in accordance with the present invention) obtained from a separate batch of EMD.
[6]The cell contained a cathode having unreduced EMD (not preconditioned in accordance with the present invention) obtained from yet another batch of EMD.

Mean discharge capacity is a primary figure of merit of a cell. Because the cut-off voltage was constant, the mean discharge capacities listed above are indicative of the relative times that a battery-operated device would operate in association with the corresponding cell. The mean discharge capacity of the cell containing a cathode having EMD preconditioned in accordance with the present invention (EMD Sample A) as its active ingredient was significantly higher after 30 cycles than the mean discharge capacities of the other cells after 30 cycles, the difference being about 5.5 to about 10.5 percent. The cell containing a cathode having EMD preconditioned in accordance with the present invention (using a higher ratio of hydroquinone to initial unreduced EMD (1:10)) outperformed the other cells after about the tenth cycle.

EXAMPLE IV

Tests were conducted to compare the rechargeability of electrolytic manganese dioxide (EMD) partially reduced with hydroquinone ($C_6H_4(OH)_2$) in accordance with the present invention with the rechargeability of EMD partially reduced with hydrazine ($N_2H_4$). The rechargeabilities of these two types of preconditioned EMD were determined based on the ability of each type of EMD to be recharged in a laboratory alkaline electrochemical cell. The ability of each type of EMD to be recharged in a cell was indicated by the discharge capacity exhibited by the EMD in a drain test following recharging the cell.

In determining the rechargeability of EMD preconditioned with hydrazine, discharge capacity tests were carried out on one group of three samples. In determining the rechargeability of EMD preconditioned with hydroquinone in accordance with the invention, discharge capacity tests were carried out on two groups of three samples. The rechargeability of each type of EMD was then calculated from the discharge capacities of the samples in the corresponding group. The groups and samples tested were as follows:

| Group I | Group II | Group III |
|---|---|---|
| Sample A - hydrazine partially reduced and then recharged EMD | Sample D - hydroquinone partially reduced and then recharged EMD | Sample G - hydroquinone partially reduced and then recharged EMD |
| Sample B - hydrazine partially reduced EMD | Sample E - hydroquinone partially reduced EMD | Sample H - hydroquinone partially reduced EMD |
| Sample C - control (unreduced EMD) | Sample F - control (unreduced EMD) | Sample I - control (unreduced EMD) |

Forming the Samples

Each sample was formed using "KM Manganese Dioxide" EMD obtained from Kerr-McGee Chemical Co. (Lot 0718).

First, the samples partially reduced with hydrazine, samples A and B, were prepared. Ten grams of "KM Manganese Dioxide" EMD were slurried in 150 mL of a 0.01M sodium hydroxide solution in a multi-neck round bottom flask. The solids content of the slurry was about 6.3%. Dissolved oxygen was removed from the slurry by purging the slurry with nitrogen. An aqueous solution essentially free of dissolved oxygen and containing approximately 1.0% by weight of hydrazine sulfate ($N_2H_4.H_2SO_4$) was then formed by dissolving 0.34 g of hydrazine sulfate in 33 mL of deaerated distilled water in a nitrogen glove box. The hydrazine solution was placed in a sealed addition funnel. The entire hydrazine sulfate solution (34 mL) was then added drop wise to the slurry on a continuous basis at a rate of about 7 mL per minute over a 5 minute period without allowing a significant amount of oxygen to enter the slurry (by controlled gravity drip from the addition funnel into the flask). The slurry was maintained at ambient temperature and continuously stirred with a magnetic stirrer and bubbling nitrogen in a nitrogen atmosphere while the hydrazine sulfate solution was added thereto and while the reaction between the EMD and hydrazine took place. The reaction occurred rapidly, liberating 60 cm$^3$ of nitrogen ($N_2$) gas. The ratio of the total weight of hydrazine ($N_2H_4$) (the active component of hydrazine sulfate) added to the slurry to the total weight of the initial unreduced EMD was about 0.084:10. The reaction was complete by the time the entire solution of hydrazine sulfate was added to the slurry. Once the reaction was complete, the slurry was filtered through a 0.45 micron MILLIPORE ® filter to remove the partially reduced EMD therefrom. The partially reduced EMD was then washed with distilled water and filtered, three times, and dried for 15 hours in a vacuum oven at 80° C. Two 1.00 g portions were separated from the preconditioned EMD to form samples A and B, respectively.

Control sample C consisted of 100 g of unreduced "KM Manganese Dioxide" EMD (not preconditioned).

Next, the EMD samples partially reduced with hydroquinone in accordance with the invention forming Group II, samples D and E, were prepared. An aqueous solution essentially free of dissolved oxygen and containing approximately 1.0% by weight hydroquinone was formed by dissolving 0.50 g hydroquinone in 50 mL of deaerated distilled water in a nitrogen glove box. The hydroquinone was placed in a sealed addition funnel. An EMD slurry essentially free of dissolved oxygen and having a pH of about 10.7 was then formed by combining 10 g of "KM Manganese Dioxide" EMD with 150 mL of a 0.01M sodium hydroxide solution in a multineck round bottom flask. The solids content of the slurry was about 6.3%. Dissolved oxygen was removed from the slurry by purging the slurry with nitrogen. The entire solution of hydroquinone (55 mL) was then added to the slurry on a continuous basis at a rate of about 1 mL per minute over a 55 minute period without allowing a significant amount of oxygen to enter the slurry (by controlled gravity drip from the funnel into the flask). The slurry was maintained at ambient temperature and continuously stirred with a magnetic stirrer and bubbling nitrogen in a nitrogen atmosphere while the solution of hydroquinone was added thereto and while the reaction was carried out. The ratio of the total weight of hydroquinone added to the slurry to the total weight of the initial unreduced EMD was about 0.05:1. The components were allowed to react for about 17 hours after the entire solution of hydroquinone was added to the slurry. The slurry was then filtered through a 0.45 micron MILLIPORE ® filter to remove the partially reduced EMD therefrom. The partially reduced EMD was then washed with distilled water and filtered, three times, and dried for 15 hours in a vacuum at 80° C. Two 100 g portions were separated from the preconditioned EMD to form samples D and E, respectively.

Control sample F of Group II consisted of 100 g of unreduced "KM Manganese Dioxide" EMD (not preconditioned).

Samples G and H forming Group III were then formed in the same manner that samples D and E were formed.

Control sample I of Group III also consisted of 100 g of unreduced "KM Manganese Dioxide" EMD (not preconditioned).

Preparing the Samples for the Discharge Capacity Tests

Each sample was then admixed with approximately 2.96 g of graphite and approximately 0.59 g of a 9M potassium hydroxide solution and pressed into a pellet in a plastic cell to form a test electrode in the cell. Each cell was completed with a mercury/mercury oxide reference electrode, an electrolyte consisting of a 9M potassium hydroxide solution and a zinc anode.

Samples A, D and G were then each recharged in their corresponding laboratory cell with a constant voltage and constant current power supply at a constant current of 20 mA until the cell voltage rose to 1.73 V (as measured with a voltmeter). The recharge mode was then shifted to constant voltage. The total recharge time was 17 hours.

The Discharge capacity Tests

Samples A–I were then cathodically discharged with the three cells of each group, Group I, Group II and Group III, being discharged simultaneously as three cells in series using a polarization current of approximately 20 mA per gram of EMD in each pellet to a cut-off potential of −0.333 V vs a the mercury/mercury oxide reference electrode. The cut-off potential of −0.333 V vs the mercury/mercury oxide reference electrode corresponds to a cut-off potential of 100 v vs a zinc reference electrode, which is often considered the minimum useful voltage of an alkaline cell. The discharge capacity of each sample was determined as the current or drain rate of 20 mA per gram of EMD multiplied by the time to the cut-off potential (−0.333 V vs Hg/HgO). Details of the laboratory set up and test procedure used are provided by the article by S. F. Burkhardt in the handbook edited by D. Glover, B. Schumm, Jr. and A. Kozawa entitled "Handbook of Manganese Dioxides, Battery Grade" (1989).

The discharge capacities of the samples were as follows:

| Group I | Group II | Group III |
|---|---|---|
| Sample A - 233.6 mA h/g | Sample D - 233.3 mA h/g | Sample G - 226.1 mA h/g |
| Sample B - 230.0 mA h/g | Sample E - 219.7 mA h/g | Sample H - 209.4 mA h/g |
| Sample C - 251.7 mA h/g | Sample F - 252.2 mA h/g | Sample I - 248.3 mA h/g |

The discharge capacities of the samples of each group were then used to calculate the rechargeability of the type of EMD in each group in accordance with the following equation:

Rechargeability = 100 [(discharge capacity of partially reduced and then recharged EMD) − (discharge capacity of partially reduced EMD)] ÷ [(discharge capacity of unreduced EMD) −

(discharge capacity of partially reduced EMD)]

The rechargeability of EMD partially reduced with hydrazine (corresponding to Group I)=100 [(233.6)−(230.0)]÷[(251.7)−(230.0)]=16.6%.

The rechargeability of the first batch of EMD partially reduced with hydroquinone in accordance with the invention (corresponding to Group II)=100 [(233.3)−(219.7)]÷[(252.2)−(219.7)]=41.8%.

Finally, the rechargeability of EMD partially reduced with hydroquinone in accordance with the invention (corresponding to Group III)=100 [(226.1)−(209.4)]÷[(248.3)−(209.4)]=42.9%.

Thus, EMD partially reduced with hydroquinone is more rechargeable and yields more discharge capacity after a given level of prereduction than EMD reduced with hydrazine. The rechargeability of the EMD partially reduced with hydroquinone in each of Groups II and III was more than twice as great than the rechargeability of EMD partially reduced with hydrazine. It is believed that hydrazine reduces a significant amount of the EMD all the way to $Mn(OH)_2$, which is not rechargeable, whereas hydroquinone converts at least most of the EMD to MnOOH, which is more rechargeable.

Because the hydroquinone and EMD were left in contact for 17 hours in partially reducing the EMD with hydroquinone for the above tests, the rechargeabilities of the corresponding EMD samples were not as great as they would have been if the hydroquinone and EMD had been left in contact for less time. As shown by the previous examples, one hour is the optimum reaction time.

It should also be noted that even EMD partially reduced with hydroquinone in accordance with the invention by allowing the components to react for the optimum time cannot generally be 100% recharged. MnOOH is not amenable to 100% recharge, as the potential required would be so positive that side reactions would recur that are deleterious to the cell. For example, as described in the application, using too high of a recharge voltage can convert the manganese dioxide to manganate ions. In order to prevent the application of too high of a potential during recharge, rechargeable alkaline zinc-manganese dioxide cells are typically recharged using a maximum recharge potential of about 1.73 V vs the zinc electrode, which does not significantly convert the MnOOH to $MnO_2$.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the invention recited herein may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. A method of preconditioning manganese dioxide to thereby produce a cathodic material for use in a rechargeable alkaline electrochemical cell comprising:
   contacting unreduced manganese dioxide with a solution of hydroquinone in an environment having a pH greater than or equal to 5 that is essentially free of dissolved oxygen, said solution of hydroquinone having a concentration of hydroquinone and being used in an amount, and said contacting step being carried out for a period of time and by means, effective for partially reducing said unreduced manganese dioxide in a substantially uniform manner such that a sufficient portion of said unreduced manganese dioxide is converted to MnOOH to thereby yield a uniformly partially reduced manganese dioxide cathodic product generally represented by the formula $MnO_x$ wherein x is between 1.80 and 1.92 and
   separating said hydroquinone from said partially reduced manganese dioxide product such that said partially reduced manganese dioxide product is substantially hydroquinone-free.

2. The method of claim 1 wherein said unreduced manganese dioxide is electrolytic manganese dioxide.

3. The method of claim 1 wherein said contacting step is carried out in an environment having a pH of from about 5 to about 10.

4. The method of claim 3 wherein the pH of said environment is from about 6 to about 8.

5. The method of claim 1 wherein said hydroquinone is present in said solution thereof in a concentration of from about 1% by weight based on the weight of said solution to a concentration corresponding to the maximum amount of hydroquinone that is soluble in said solution.

6. The method of claim 5 wherein said hydroquinone is present in said solution thereof in a concentration of from about 5% to about 10% by weight based on the weight of said solution.

7. The method of claim 1 wherein said solution of hydroquinone has a concentration of hydroquinone and is used in an amount such that the ratio of the total weight of hydroquinone contacted with said unreduced manganese dioxide while the method is carried out to the total weight of said unreduced manganese dioxide is from about 0.3:10 to about 2:10.

8. The method of claim 7 wherein said solution of hydroquinone has a concentration of hydroquinone and is used in an amount such that the ratio of the total weight of hydroquinone contacted with said unreduced manganese dioxide while the method is carried out to the total weight of said unreduced manganese dioxide is about 0.5:10.

9. The method of claim 1 wherein:
   said method further comprises the step of prior to contacting said unreduced manganese dioxide with said solution of hydroquinone, forming a slurry comprising said unreduced manganese dioxide suspended in a solution having a pH greater than or equal to 5; and
   wherein said step of contacting said unreduced manganese dioxide with said solution of hydroquinone is carried out by adding said solution of hydroquinone to said slurry.

10. A method of preconditioning manganese dioxide to thereby produce a cathodic material for use in a rechargeable alkaline electrochemical cell comprising:
    forming a solution of hydroquinone that is essentially free of dissolved oxygen;
    forming a slurry including unreduced manganese dioxide suspended in a solution having a pH greater than or equal to 5, said slurry being essentially free of dissolved oxygen;
    adding said solution of hydroquinone to said slurry without allowing a significant amount of oxygen to enter said slurry, said solution of hydroquinone having a concentration of hydroquinone and being added to said slurry in an amount such that the ratio of the total weight of hydroquinone contacted with said unreduced manganese dioxide to the total weight of said unreduced manganese dioxide is from about 0.3:10 to about 2:10;
    blending said solution of hydroquinone with said slurry such that said manganese dioxide is partially reduced in a substantially uniform manner to convert a portion of said manganese dioxide to MnOOH; and
    after allowing the hydroquinone to reduce a sufficient portion of said unreduced manganese dioxide to MnOOH such that a uniform partially reduced manganese dioxide cathodic product generally represented by the formula $MnO_x$ wherein x is between 1.80 and 1.92 is produced, separating the partially reduced manganese dioxide product from said slurry such that said partially reduced manganese dioxide product is substantially hydroquinone-free.

11. The method of claim 10 wherein said unreduced manganese dioxide is electrolytic manganese dioxide.

12. The method of claim 11 wherein said slurry is formed to include said unreduced electrolytic manganese dioxide suspended in a solution having a pH of from about 5 to about 10.

13. The method of claim 11 wherein said solution of hydroquinone is formed such that hydroquinone is present therein in a concentration of from about 5% to about 10% by weight based on the weight of said solution.

14. The method of claim 13 wherein said solution of hydroquinone is formed to have a concentration of hydroquinone and is added to said slurry in an amount such that the ratio of the total weight of hydroquinone contacted with said unreduced electrolytic manganese dioxide to the total weight of said unreduced electrolytic manganese dioxide is about 0.5:10.

15. The method of claim 13 wherein said solution of hydroquinone is added to said slurry continuously over a period of time of from about 5 to about 60 minutes.

16. The method of claim 15 wherein from about 30 minutes to about 90 minutes are allowed to elapse after all of said solution of hydroquinone is added to said slurry and before said partially reduced electrolytic manganese dioxide is separated from said slurry.

* * * * *